(12) United States Patent
Birnkrant et al.

(10) Patent No.: US 10,852,202 B2
(45) Date of Patent: Dec. 1, 2020

(54) HIGH SENSITIVITY FIBER OPTIC BASED DETECTION

(71) Applicant: Kidde Technologies, Inc., Wilson, NC (US)

(72) Inventors: Michael J. Birnkrant, Wethersfield, CT (US); Kenneth Bell, Epsom (GB); Stefan Coreth, Roanoke Rapids, NC (US); Peter R. Harris, West Hartford, CT (US); Antonio M. Vincitore, Lakeville, MN (US); Jennifer M. Alexander, Roseville, MN (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 235 days.

(21) Appl. No.: 15/809,703

(22) Filed: Nov. 10, 2017

(65) Prior Publication Data
US 2018/0136054 A1 May 17, 2018

Related U.S. Application Data

(60) Provisional application No. 62/420,841, filed on Nov. 11, 2016.

(51) Int. Cl.
*G01K 11/32* (2006.01)
*G08B 29/18* (2006.01)
(Continued)

(52) U.S. Cl.
CPC .............. *G01K 11/32* (2013.01); *G08B 17/06* (2013.01); *G08B 17/107* (2013.01); *G08B 29/185* (2013.01)

(58) Field of Classification Search
CPC ........... G01K 2011/324; G01K 11/3206; G01J 5/0821; G01J 5/0896; G01J 3/44;
(Continued)

(56) References Cited

U.S. PATENT DOCUMENTS

| 4,701,624 A | 10/1987 | Kern et al. |
| 5,035,511 A * | 7/1991 | Berthold ................ G01K 11/32 250/227.12 |

(Continued)

FOREIGN PATENT DOCUMENTS

| CN | 1363828 A | 8/2002 |
| CN | 102881107 A * | 1/2013 |

(Continued)

OTHER PUBLICATIONS

European Search Report for Application No. 17201023.3; dated Apr. 9, 2018; 17 pages.

(Continued)

*Primary Examiner* — Gail Kaplan Verbitsky
(74) *Attorney, Agent, or Firm* — Cantor Colburn LLP

(57) ABSTRACT

A detection system for measuring the presence of one or more conditions in a predetermined area includes a fiber harness having at least one fiber optic cable for transmitting light. The at least one fiber optic cable defines a node arranged to measure the one or more conditions. The node is arranged such that light scattered by an atmosphere adjacent the node is received by at least one core of the fiber optic cable. A control system operably connected to the fiber harness includes a light source for transmitting light to the node and a light sensitive device configured to receive scattered light associated with the node. The control system analyzes more than one signal corresponding to more than one wavelength of the scattered light associated with the node to determine at least one of a presence and magnitude of the one or more conditions at the node.

16 Claims, 14 Drawing Sheets

(51) Int. Cl.
*G08B 17/06* (2006.01)
*G08B 17/107* (2006.01)

(58) Field of Classification Search
CPC ...... G01J 3/32; G01J 3/36; G01J 5/08; G01N 2021/6484; G01N 21/84; G01N 2201/0612; G01N 15/0205; G01N 2201/1211; G01N 15/1436; G01N 21/474; G01N 21/65; A61L 35/1455; A61L 31/00165; A61L 31/0638; A61L 31/07; A61B 5/1455; A61B 1/00165; A61B 1/0638; A61B 1/07; A61B 5/0059
USPC ...................................................... 356/43, 44
See application file for complete search history.

(56) References Cited

U.S. PATENT DOCUMENTS

| | | | |
|---|---|---|---|
| 5,051,590 A | 9/1991 | Kern et al. | |
| 5,051,595 A | 9/1991 | Kern et al. | |
| 5,164,604 A | 11/1992 | Blair et al. | |
| 5,217,306 A * | 6/1993 | Wada | G01K 11/32 356/301 |
| 6,011,478 A | 1/2000 | Suzuki et al. | |
| 6,111,511 A * | 8/2000 | Sivathanu | G08B 17/12 250/336.1 |
| 6,449,400 B1 * | 9/2002 | Watanabe | G01M 11/3109 385/12 |
| 6,606,148 B2 * | 8/2003 | Fredin | G01K 11/32 356/73.1 |
| 6,960,019 B2 | 11/2005 | Dammann | |
| 7,057,714 B2 * | 6/2006 | Fredin | G01K 11/32 356/73.1 |
| 7,301,641 B1 | 11/2007 | Overby et al. | |
| 7,319,411 B2 * | 1/2008 | Ong | G08C 19/04 340/870.11 |
| 7,688,199 B2 | 3/2010 | Zhang et al. | |
| 7,777,634 B2 | 8/2010 | Kaelin et al. | |
| 8,035,527 B2 | 10/2011 | Powell | |
| 8,075,181 B1 * | 12/2011 | Stauffer | A61B 5/015 374/121 |
| 8,634,069 B2 * | 1/2014 | Nakano | G01N 21/9501 356/237.1 |
| 10,665,075 B2 * | 5/2020 | Birnkrant | B64D 45/00 |
| 2002/0036234 A1 * | 3/2002 | Tang | G01N 21/31 235/454 |
| 2003/0021528 A1 * | 1/2003 | Fredin | G01K 11/32 385/31 |
| 2004/0027560 A1 * | 2/2004 | Fredin | G01K 11/32 356/73.1 |
| 2006/0239330 A1 * | 10/2006 | Yamate | G01K 11/32 374/161 |
| 2006/0245468 A1 * | 11/2006 | Hartog | G01K 11/32 374/161 |
| 2009/0059996 A1 * | 3/2009 | Komeda | G01K 11/32 374/161 |
| 2013/0033377 A1 | 2/2013 | Hoseit | |
| 2013/0156066 A1 * | 6/2013 | Kwon, II | G01K 11/32 374/161 |
| 2015/0062591 A1 * | 3/2015 | Wax | G01N 21/4795 356/479 |
| 2019/0018143 A1 * | 1/2019 | Thayer | G01S 7/484 |
| 2019/0094082 A1 * | 3/2019 | Koizumi | G01J 5/58 |
| 2019/0145883 A1 * | 5/2019 | Burriel | G01N 1/2273 |

FOREIGN PATENT DOCUMENTS

| | | | |
|---|---|---|---|
| CN | 103454014 A | | 12/2013 |
| CN | 204087417 U | | 1/2015 |
| CN | 208488547 U | * | 2/2019 |
| DE | 102013213721 A1 | | 5/2014 |
| EP | 1887536 A1 | | 2/2008 |
| EP | 234309 A | * | 8/2009 |
| EP | 2336993 A1 | | 6/2011 |
| EP | 2463837 A1 | | 6/2012 |
| GB | 002184829 A | * | 12/1984 |
| GB | 2181830 A | | 4/1987 |
| JP | H03136195 A | | 6/1991 |
| JP | 4042039424 A | * | 7/1992 |

OTHER PUBLICATIONS

European Office Action; International Application No. 17201023.3-1206; International Filing Date: Nov. 10, 2017, dated Apr. 1, 2020; 64 pages.

Chinese Office Action; International Application No. 201711111668.3; International Filing Date: Nov. 10, 2017, dated Jun. 18, 2020; 8 pages.

* cited by examiner

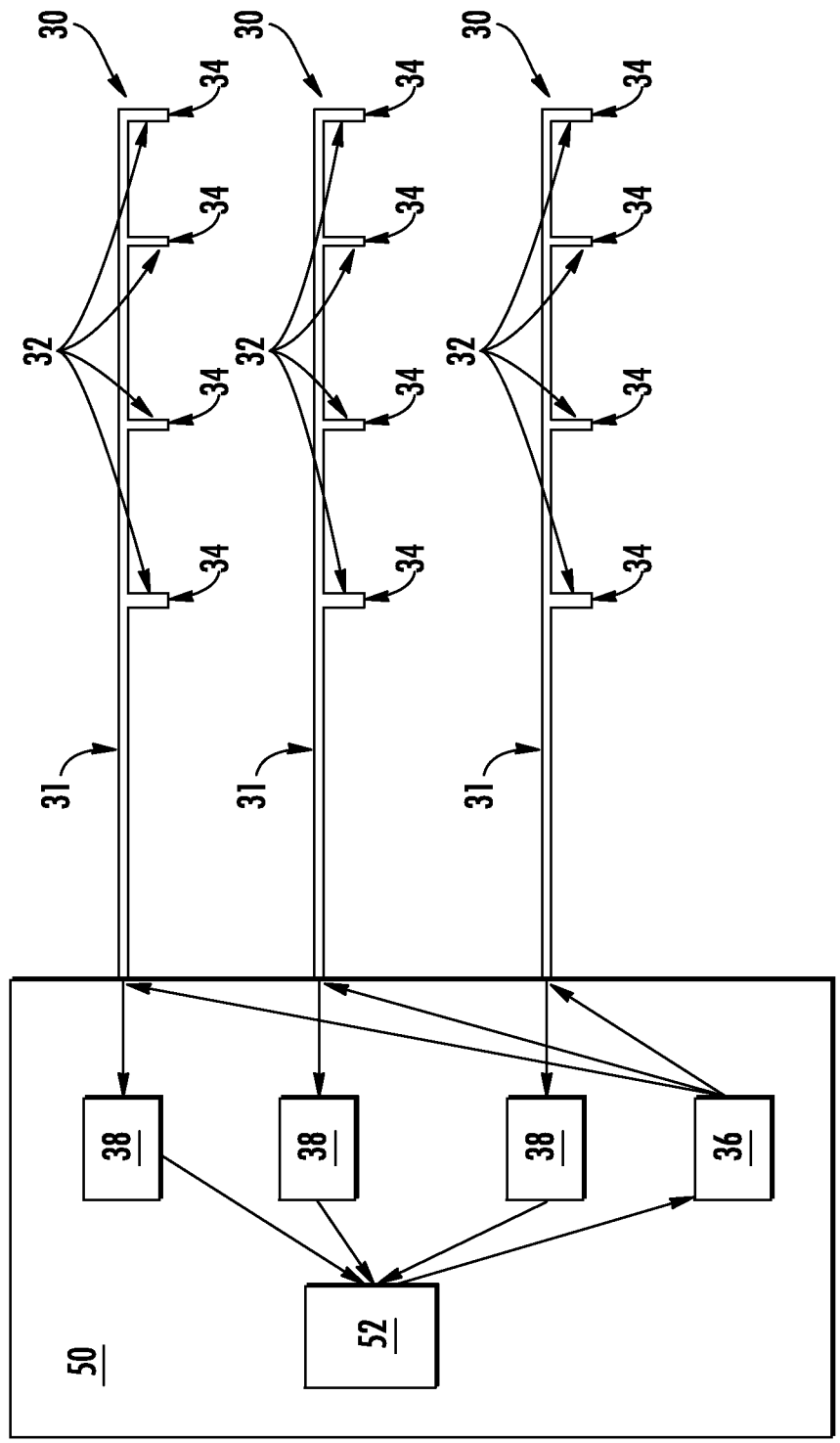

HIGH SENSITIVITY FIBER OPTIC BASED DETECTION

CROSS-REFERENCE TO RELATED APPLICATIONS

This application claims the benefit of 62/420,841 filed Nov. 11, 2016, which is incorporated herein by reference in its entirety.

BACKGROUND

Embodiments of this disclosure relate generally to a system for detecting predefined conditions within a protected space and, more particularly, to a fiber optic detection system.

Conventional photoelectric smoke detection systems operate by detecting the presence of smoke or other airborne pollutants utilizing light. Upon detection of a threshold level of particles, an alarm or other signal, such as a notification signal, may be activated and operation of a fire suppression system may be initiated. Throughout the specification, the term alarm will be used to indicate these possible outcomes of a detection.

Smoke detection systems are susceptible to alarms generated from a source that is not a hazard. As an example, the presence of non-hazardous particulates near or inside the smoke detection system creates a false alarm condition. The particles may include non-combustible or combustible materials, which create a condition within the detector that mimics smoke. The ability for a smoke detection system to discriminate smoke from non-hazardous sources reduces false alarms.

Smoke detection systems utilize anisotropic light scattering to reduce false alarms. The anisotropic light scattering results in the number of photons being redirected from their original direction non-uniformly with respect to angle. In practice, this can be accomplished utilizing a combination of opto-electronic detectors and light sources arranged and oriented such that more than one angle is utilized for determination of an alarm condition.

Current aircraft regulation, FAR 25.858, requires not only the detection of a fire in the cargo compartment of the aircraft, but also providing a visual indication to the crew of the aircraft within one minute. However, fires that are much smaller in size, in critical locations or in areas not currently protected, possess a risk. Early reliable detection would allow for better control of the fire. Higher sensitivity of the fire detection system enables earlier detection, but increases the risk of false alarms. Advances in signal processing and sensor design for point sensors and aspirating systems have decreased nuisance alarms by incorporating temperature and smoke detection. However, the size and complexity of these systems restricts sensing to larger parts of the plane.

SUMMARY

According to a first embodiment, a detection system for measuring the presence of one or more conditions in a predetermined area includes a fiber harness having at least one fiber optic cable for transmitting light. The at least one fiber optic cable defines a node arranged to measure the one or more conditions. The node is arranged such that light scattered by an atmosphere adjacent the node is received by at least one core of the fiber optic cable. A control system operably connected to the fiber harness includes a light source for transmitting light to the node and a light sensitive device configured to receive scattered light associated with the node. The control system analyzes more than one signal corresponding to more than one wavelength of the scattered light associated with the node to determine at least one of a presence and magnitude of the one or more conditions at the node.

In addition to one or more of the features described above, or as an alternative, in further embodiments the control system analyzes the more than one signal corresponding to the more than one wavelength of the scattered light to determine a temperature near the node.

In addition to one or more of the features described above, or as an alternative, in further embodiments the more than one signal includes a first signal corresponding to a first wavelength and a second signal corresponding to a second wavelength, the first wavelength and the second wavelength being different.

In addition to one or more of the features described above, or as an alternative, in further embodiments comprising a device configured to split the scattered light from the node into more than one wavelength.

In addition to one or more of the features described above, or as an alternative, in further embodiments the at least one light sensitive device is a photodiode.

In addition to one or more of the features described above, or as an alternative, in further embodiments at least one wavelength of the more than one wavelength of scattered light associated with the node is transmitted to the at least one light sensitive device.

In addition to one or more of the features described above, or as an alternative, in further embodiments the at least one light sensitive device converts the at least one wavelength of the more than one wavelength of scattered light associated with the node into the at least one signal.

In addition to one or more of the features described above, or as an alternative, in further embodiments the at least one light sensitive device includes a plurality of light sensitive devices and the more than one wavelength of scattered light includes a plurality of wavelengths of scattered light, wherein each of the plurality of light sensitive devices is configured to convert one of the plurality of wavelengths of scattered light into one signal of the more than one signals.

In addition to one or more of the features described above, or as an alternative, in further embodiments the light source is a laser diode.

In addition to one or more of the features described above, or as an alternative, in further embodiments the predetermined area is a portion of an aircraft.

In addition to one or more of the features described above, or as an alternative, in further embodiments the condition is the presence of smoke in the predetermined area.

According to another embodiment, a method of detecting one or more conditions within a predetermined area includes transmitting light along a fiber harness and through a node of a fiber optic cable of the fiber harness, the node arranged to measure the one or more conditions, receiving at least one wavelength of scattered light associated with the node, communicating at least one signal corresponding to the at least one wavelength of scattered light to a control unit, and analyzing the at least one signal to determine at least one of a presence and magnitude of the one or more conditions within the predetermined area.

In addition to one or more of the features described above, or as an alternative, in further embodiments the at least one signal corresponding to the at least one wavelength of scattered light is communicated to the control unit from at least one light sensitive device.

In addition to one or more of the features described above, or as an alternative, in further embodiments the at least one light sensitive device is operably coupled to the control unit to convert the at least one wavelength of scattered light into the at least one signal.

In addition to one or more of the features described above, or as an alternative, in further embodiments comprising determining a temperature near the node.

In addition to one or more of the features described above, or as an alternative, in further embodiments determining the temperature at the node uses the at least one signal based on the at least one wavelength of scattered light associated with the node.

In addition to one or more of the features described above, or as an alternative, in further embodiments the method is configured to detect the presence or magnitude of smoke within an aircraft.

In addition to one or more of the features described above, or as an alternative, in further embodiments the temperature near the at least one node is provided to another system of the aircraft.

BRIEF DESCRIPTION OF THE DRAWINGS

The subject matter, which is regarded as the present disclosure, is particularly pointed out and distinctly claimed in the claims at the conclusion of the specification. The foregoing and other features, and advantages of the present disclosure are apparent from the following detailed description taken in conjunction with the accompanying drawings in which:

FIG. 5 is a schematic diagram of a detection system including a plurality of fiber harnesses according to an embodiment;

The detailed description explains embodiments of the present disclosure, together with advantages and features, by way of example with reference to the drawings.

DETAILED DESCRIPTION

Referring now to the FIGS., a system 20 for detecting one or more conditions or events within a designated area is illustrated. The detection system 20 may be able to detect one or more hazardous conditions, including but not limited to the presence of smoke, fire, temperature, flame, or any of a plurality of pollutants, combustion products, or chemicals. Alternatively, or in addition, the detection system 20 may be configured to perform monitoring operations of people, lighting conditions, or objects. In an embodiment, the system 20 may operate in a manner similar to a motion sensor, such as to detect the presence of a person, occupants, or unauthorized access to the designated area for example. The conditions and events described herein are intended as an example only, and other suitable conditions or events are within the scope of the disclosure.

The detection system 20 uses light to evaluate a volume for the presence of a condition. In this specification, the term "light" means coherent or incoherent radiation at any frequency or a combination of frequencies in the electromagnetic spectrum. In an example, the photoelectric system uses light scattering to determine the presence of particles in the ambient atmosphere to indicate the existence of a predetermined condition or event. In this specification, the term "scattered light" may include any change to the amplitude/intensity or direction of the incident light, including reflection, refraction, diffraction, absorption, and scattering in any/all directions. In this example, light is emitted into the designated area; when the light encounters an object (a person, smoke particle, or gas molecule for example), the light can be scattered and/or absorbed due to a difference in the refractive index of the object compared to the surrounding medium (air). Depending on the object, the light can be scattered in all different directions. Observing any changes in the incident light, by detecting light scattered by an object for example, can provide information about the designated area including determining the presence of a predetermined condition or event.

Figure 1A:
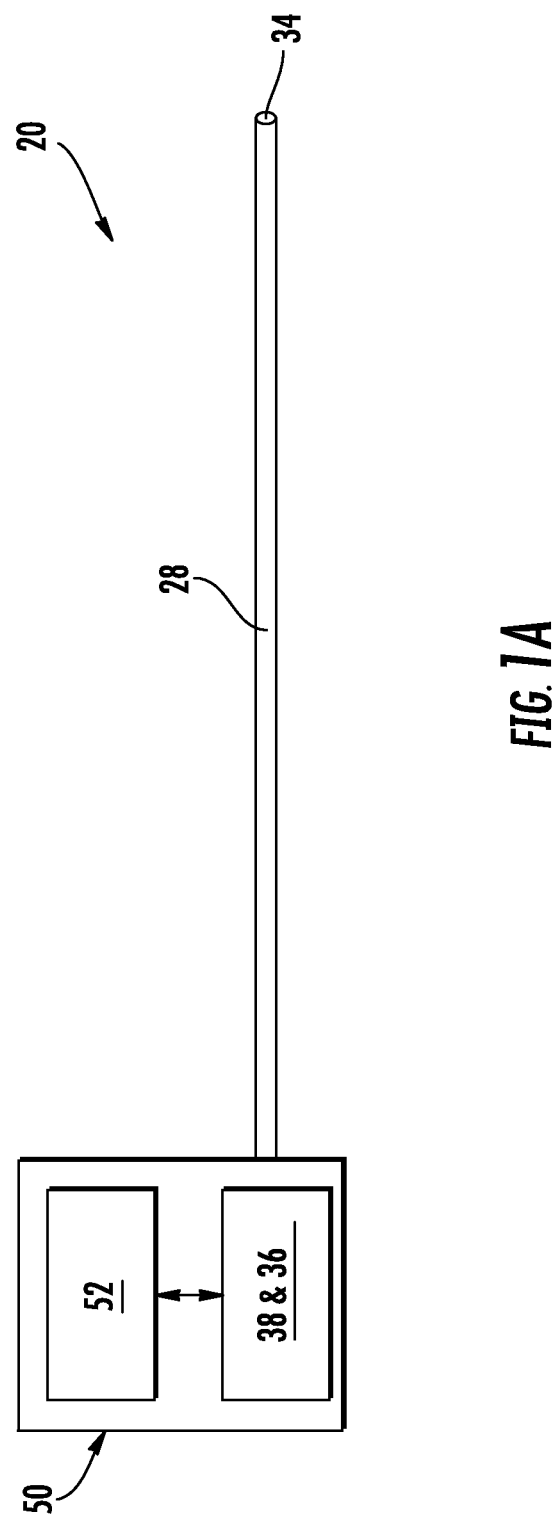
FIG. 1A is schematic diagram of a detection system according to an embodiment.
Figure 1B:
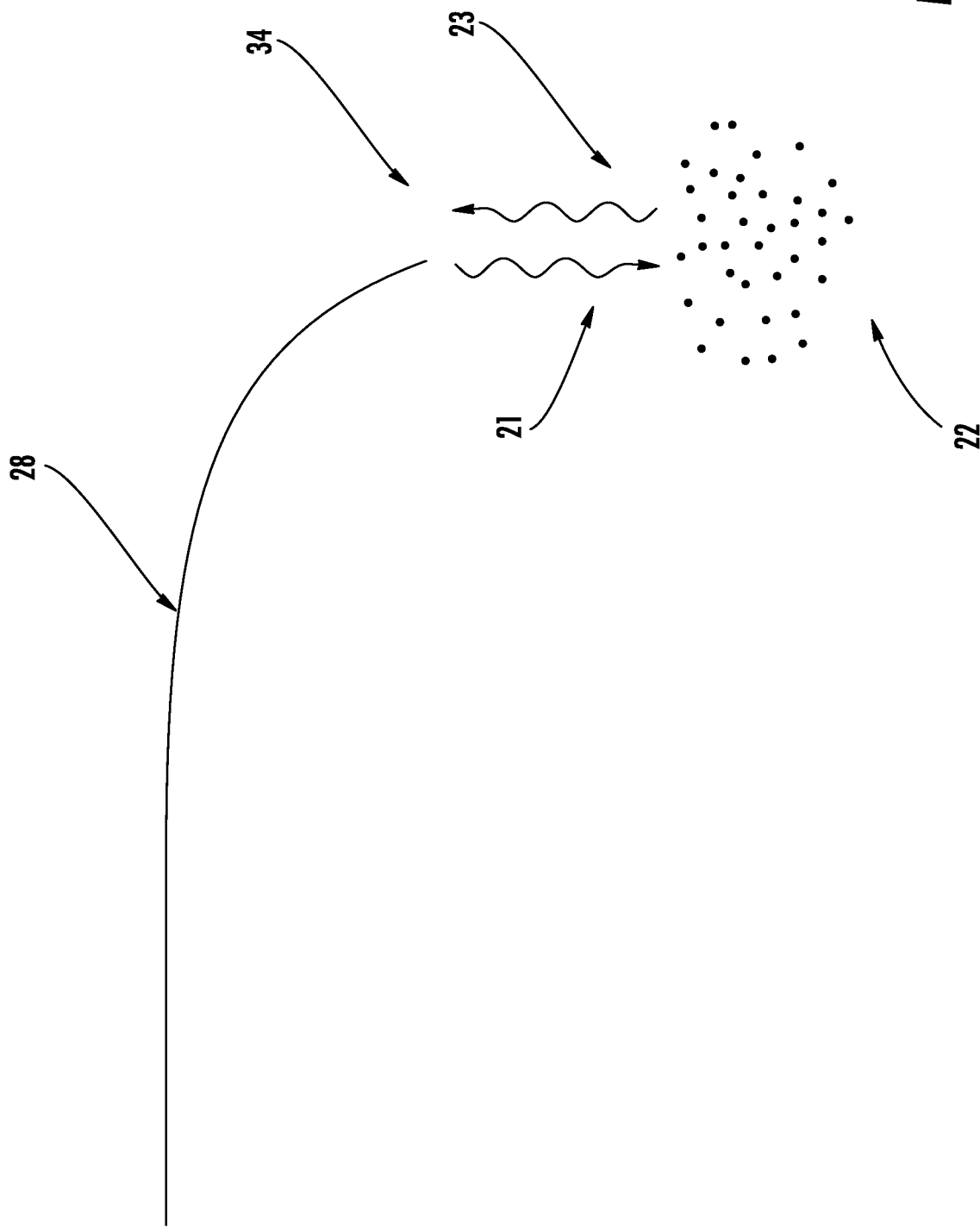
FIG. 1B is a schematic diagram of light transmission at a node of a detection system according to an embodiment.

In its most basic form, as shown in FIG. 1, the detection system 20 includes a single fiber optic cable 28 with at least one fiber optic core. The term fiber optic cable 28 includes any form of optical fiber. As examples, an optical fiber is a length of cable that is composed of one or more optical fiber cores of single-mode, multimode, polarization maintaining, photonic crystal fiber or hollow core. A node 34 is located at the termination point of a fiber optic cable 32 and is inherently included in the definition of a fiber optic cable 28. The node 34 is positioned in communication with the ambient atmosphere. A light source 36, such as a laser diode for example, and a light sensitive device 38, such as a photodiode for example, are coupled to the fiber optic cable 28. A control system 50 of the detection system 20, discussed in further detail below, is utilized to manage the detection system operation and may include control of components, data acquisition, data processing and data analysis.

As shown in FIG. 1A, the light from the light source is transmitted through the node 34 to the surrounding area, illustrated schematically at 21. The light 21 interacts with one or more particles indicative of a condition, illustrated schematically at 22, and is reflected or transmitted back to the node 34, illustrated schematically at 23. A comparison of the light provided to the node 34 and/or changes to the light reflected back to the light sensitive device 38 from the node 34 will indicate whether or not changes in the atmosphere are present in the ambient atmosphere adjacent the node 34 that are causing the scattering of the light. The scattered light as described herein is intended to additionally include reflected, transmitted, and absorbed light. Although the detection system 20 is described as using light scattering to determine a condition or event, embodiments where light obscuration, absorption, and fluorescence is used in addition to or in place of light scattering are also within the scope of the disclosure.

Figure 2A:
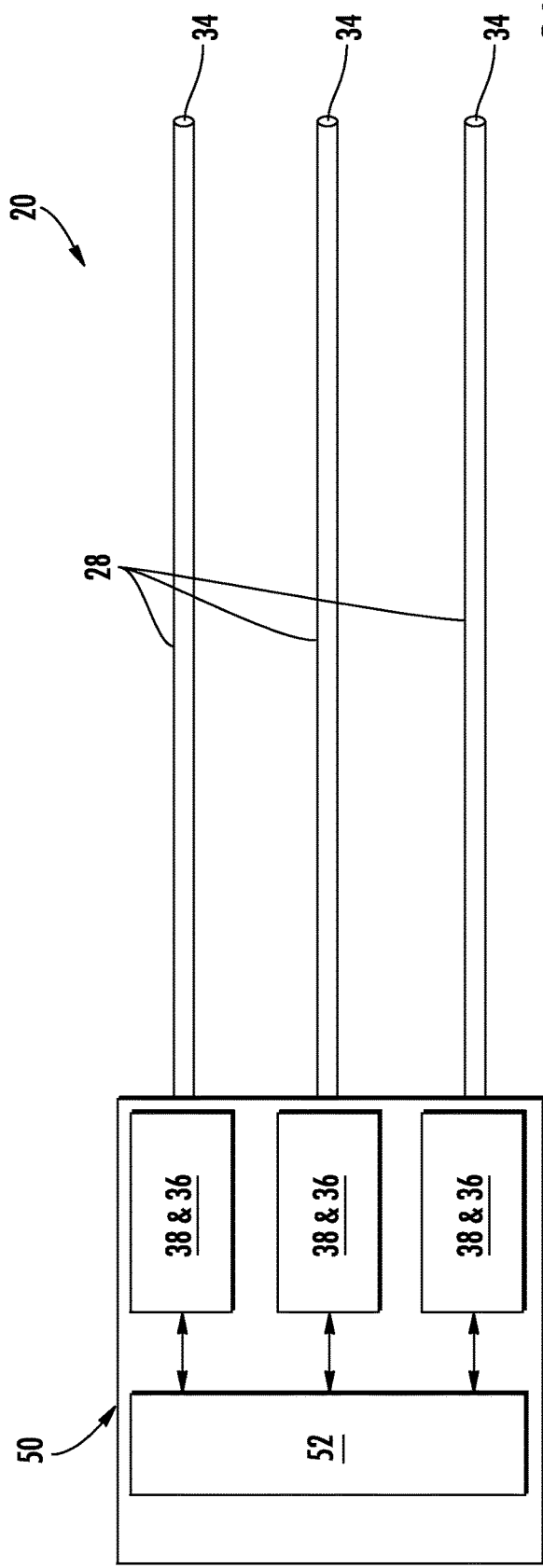
FIG. 2A is a schematic diagram of a detection system according to another embodiment.
Figure 2B:
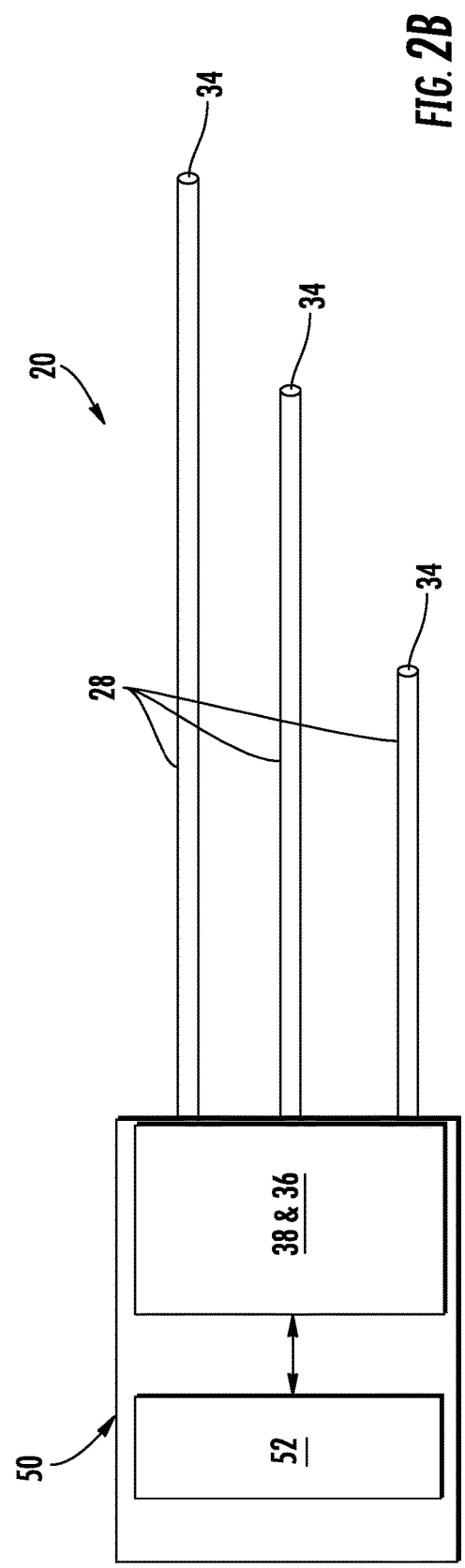
FIG. 2B is a schematic diagram of a detection system according to another embodiment.

In another embodiment, the detection system 20 can include a plurality of nodes 34. For example, as illustrated in FIG. 2A, a plurality of fiber optic cables 28 and corresponding nodes 34 are each associated with a distinct light sensitive device 38. In embodiments where an individual light sensitive device 38 is associated with each node 34, as shown in FIG. 2A, the signal output from each node 34 can be monitored. Upon detection of a predetermined event or condition, it will be possible to localize the position of the event because the position of each node 34 within the system 20 is known. Alternately, as shown in FIG. 2B, a plurality of fiber optic cables 28, may be coupled to a single light sensitive device.

In embodiments where a single light sensitive device 38 is configured to receive scattered light from a plurality of nodes 34, the control system 50 is able to localize the scattered light, i.e. identify the scattered light received from each of the plurality of nodes 34. In an embodiment, the control system 50 uses the position of each node 34, specifically the length of the fiber optic cables 28 associated with each node 34 and the corresponding time of flight (i.e. the time elapsed between when the light was emitted by the light source 36 and when the light was received by the light sensitive device 38), to associate different parts of the light signal with each of the respective nodes 34 that are connected to that light sensitive device 38. Alternatively, or in addition, the time of flight may include the time elapsed between when the light is emitted from the node and when the scattered light is received back at the node. In such embodiments, the time of flight provides information regarding the distance of the object relative to the node.

Figure 3:
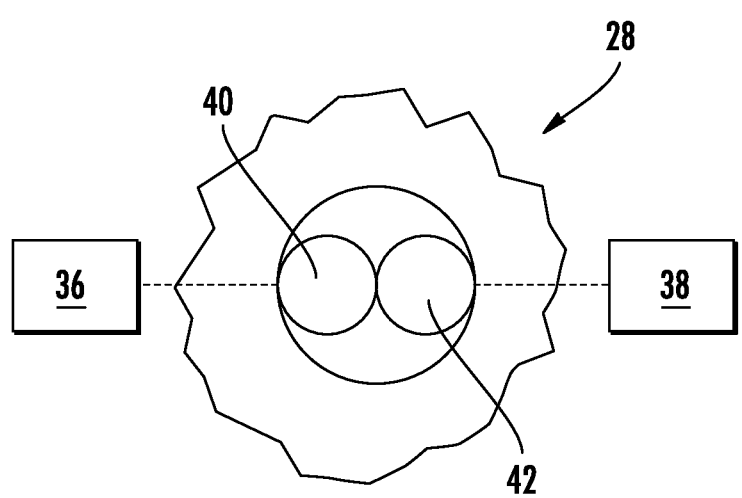
FIG. 3 is a cross-sectional view of a fiber optic node of the fiber harness of FIG. 1 according to an embodiment.

In an embodiment, illustrated in the cross-section of the fiber optic cable shown in FIG. 3, two substantially identical and parallel light transmission fiber cores 40, 42 are included in the fiber optic cable 28 and terminate at the node 34. However, it should be understood that embodiments where the fiber optic cable 28 includes only a single fiber core, or more than two cores are also contemplated herein. The light source 36 may be coupled to the first fiber core 40 and the light sensitive device 38 may be coupled to the second fiber core 42, for example near a first end of the fiber optic cable 28. The light source 36 is selectively operable to emit light, which travels down the first fiber core 40 of the fiber optic cable 28 to the node 34. At the node 34, the emitted light is expelled into the adjacent atmosphere. The light is scattered and transmitted back into the node 34 and down the fiber cable 28 to the light sensitive device 38 via the second fiber core 42.

Figure 4A:
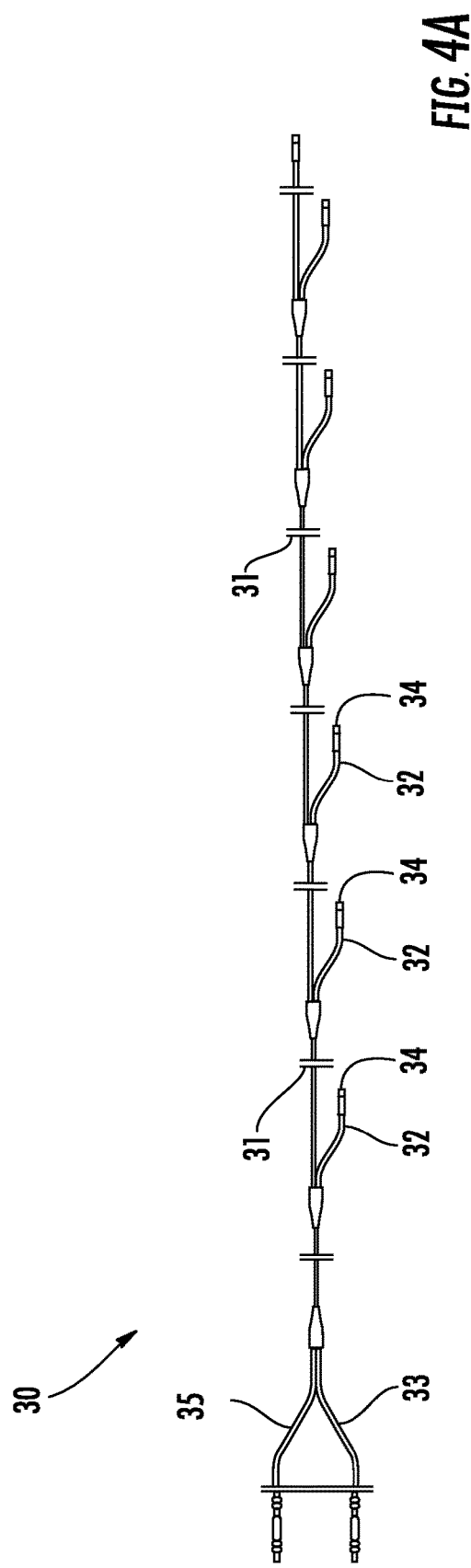
FIG. 4A is a side view of a fiber harness of a detection system according to an embodiment.
Figure 4B:
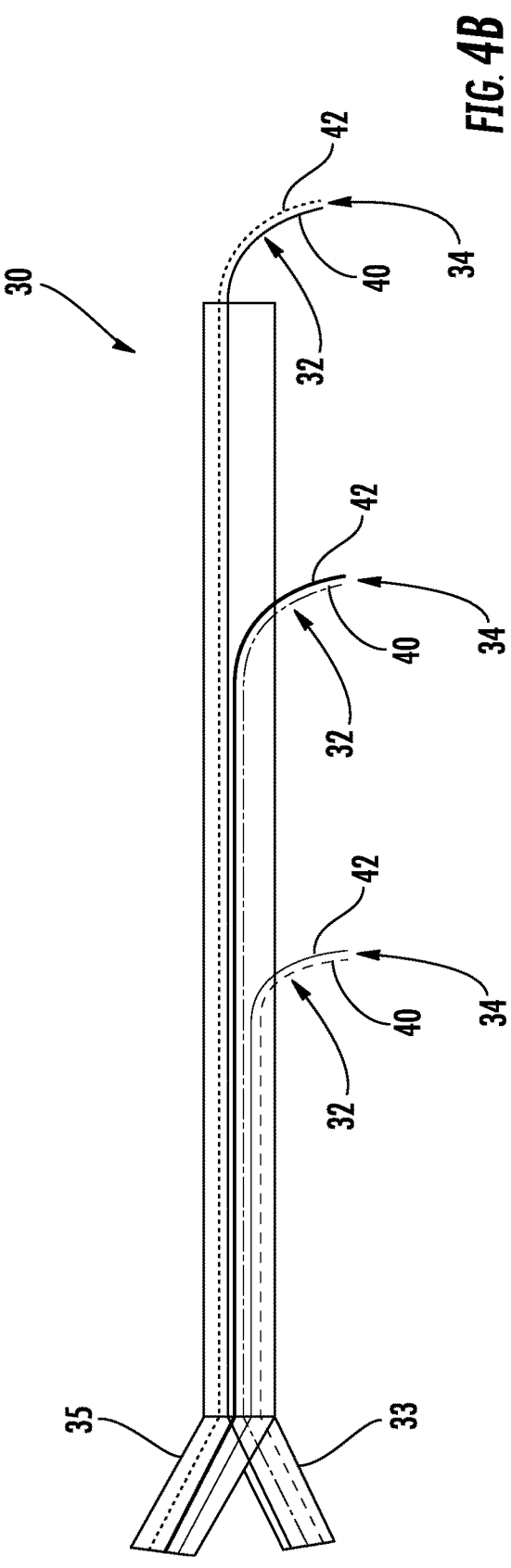
FIG. 4B is a schematic diagram of a fiber harness of a detection system according to an embodiment.

With reference now to FIG. 4A, in more complex embodiments, the detection system 20 includes a fiber harness 30 having a plurality of fiber optic cables 28 bundled together. It should be noted that a fiber harness 30 can also be only a single fiber optic cable 28. In an embodiment, a plurality of fiber cores 40, 42 are bundled together at a location to form a fiber harness backbone 31 with the ends of the fiber optic cables 28 being separated (not included in the bundled backbone) to define a plurality of fiber optic branches 32 of the fiber harness 30. As shown, the plurality of fiber cores 40, 42 branch off to form a plurality of individual fiber branches 32, each of which terminates at a node 34. In the non-limiting embodiments of FIGS. 4A and 4B, the fiber harness 30 additionally includes an emitter leg 33 and a receiver leg 35 associated with the fiber branches 32. The emitter leg 33 may contain the first fiber cores 40 from each of the plurality of fiber branches 32 and the receiver leg 35 may contain all of the second fiber cores 42 from each of the fiber branches 32. The length of the fiber optic cores 40, 42 extending between the emitter leg 33 or the receiver leg 35 and the node 34 may vary in length such that the branches 32 and corresponding nodes 34 are arranged at various positions along the length of the fiber harness backbone 31. In an embodiment, the positions of the nodes 34 may be set during manufacture, or at the time of installation of the system 20.

Alternatively, the fiber harness 30 may include a fiber optic cable (not shown) having a plurality of branches 32 integrally formed therewith and extending therefrom. The branches 32 may include only a single fiber optic core. The configuration, specifically the spacing of the nodes 34 within a fiber harness 30 may be substantially equidistant, or may vary over the length of the harness 30. In an embodiment, the positioning of each node 34 may correlate to a specific location within the designated area.

With reference now to FIG. 5, the detection system 20 may additionally include a plurality of fiber harnesses 30. In the illustrated, non-limiting embodiment, a distinct light sensitive device 38 is associated with each of the plurality of fiber harnesses 30. However, embodiments where a single light sensitive device 38 is coupled to the plurality of fiber harnesses 30 are also contemplated here. In addition, a single light source 36 may be operably coupled to the plurality of light transmission fiber cores 40 within the plurality of fiber harnesses 30 of the system 20. Alternatively, the detection system 20 may include a plurality of light sources 36, each of which is coupled to one or more of the plurality of fiber harnesses 30.

Figure 6:
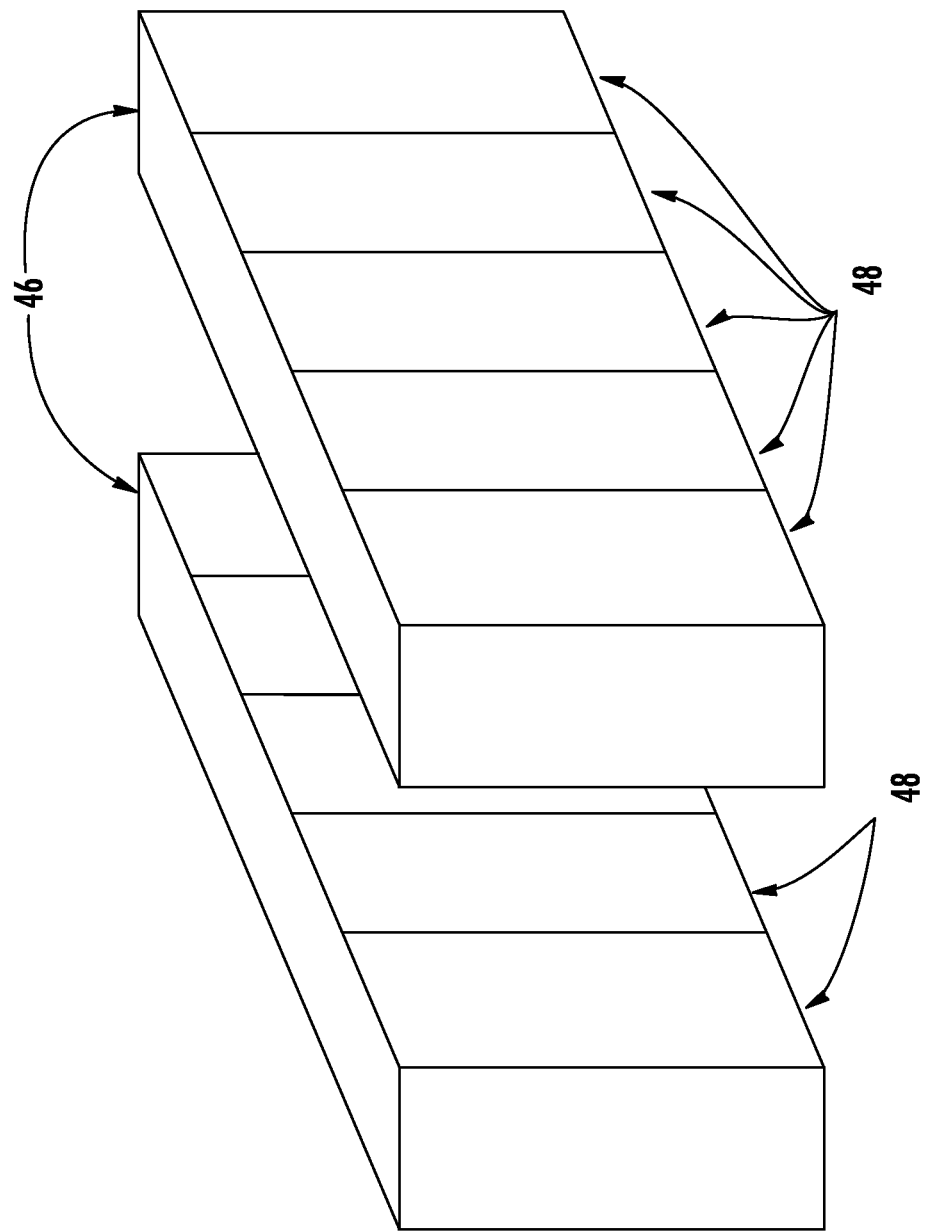
FIG. 6 is a perspective view of an area within a building to be monitored by a detection system according to an embodiment.

The detection system 20 may be configured to monitor a predetermined area such as a building. The detection system 20 may be especially utilized for predetermined areas having a crowded environment, such as a server room, as shown in FIG. 6 for example. Each fiber harness 30 may be aligned with one or more rows of equipment 46, and each node 34 therein may be located directly adjacent to one of the towers 48 within the rows 46. In addition, nodes may be arranged so as to monitor specific enclosures, electronic devices, or machinery. Positioning of the nodes 34 in such a manner allows for earlier detection of a condition as well as localization, which may limit the exposure of the other equipment in the room to the same condition. In another application, the detection system 20 may be integrated into an aircraft, such as for monitoring a cargo bay, avionics rack, lavatory, or another confined region of the aircraft that may be susceptible to fires or other events.

Figure 7:
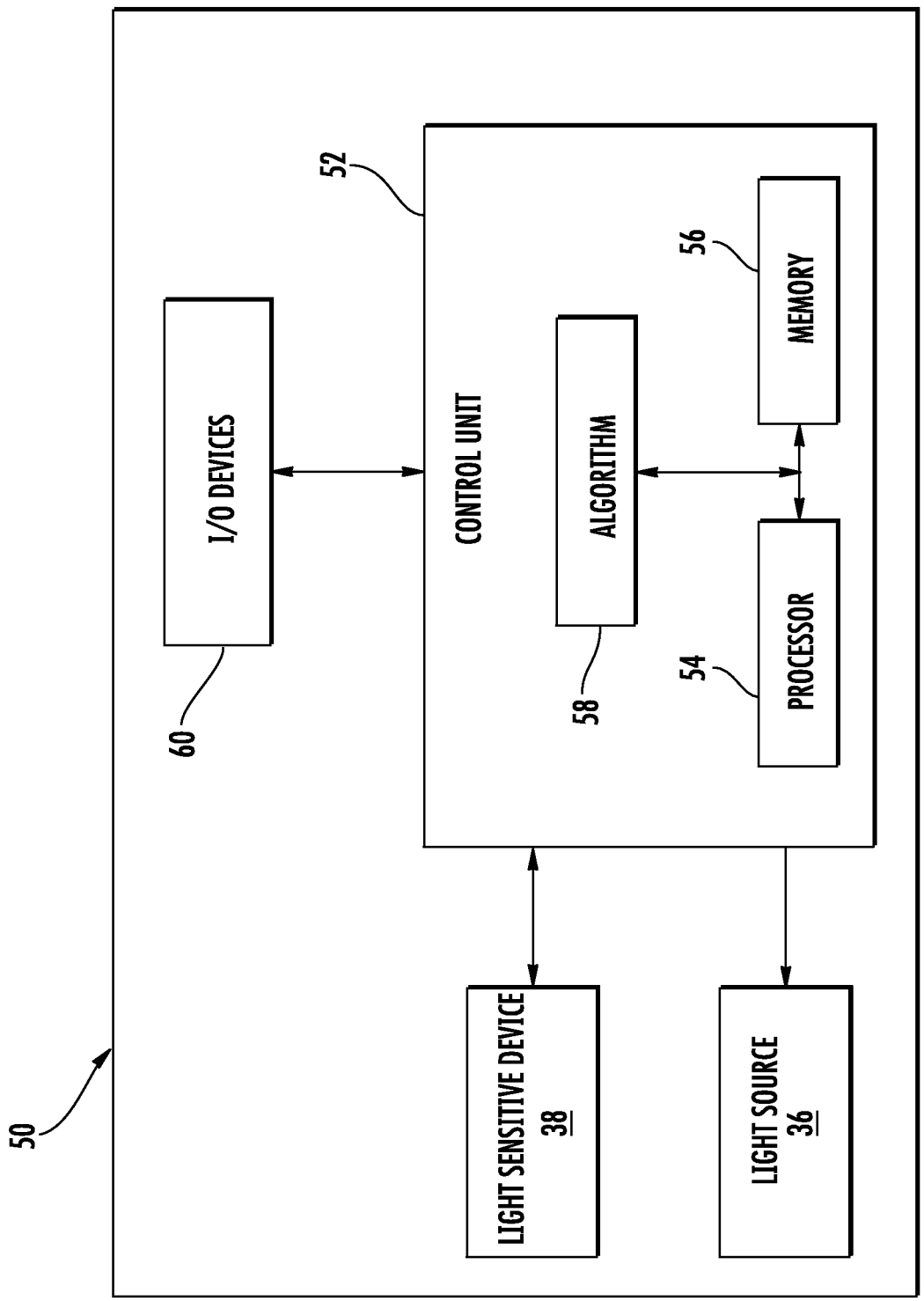
FIG. 7 is a schematic diagram of a control system of the detection system according to an embodiment.

The control system 50 of the detection system 20 is utilized to manage the detection system operation and may include control of components, data acquisition, data processing and data analysis. The control system 50, illustrated in FIG. 7, includes at least one light sensitive device 38, at least one light source, 36, and a control unit 52, such as a computer having one or more processors 54 and memory 56 for implementing an algorithm 58 as executable instructions that are executed by the processor 54. The instructions may be stored or organized in any manner at any level of abstraction. The processor 54 may be any type of processor, including a central processing unit ("CPU"), a general purpose processor, a digital signal processor, a microcontroller, an application specific integrated circuit ("ASIC"), a field programmable gate array ("FPGA"), or the like. Also, in some embodiments, memory 56 may include random access memory ("RAM"), read only memory ("ROM") or other electronic, optical, magnetic, or any other computer readable medium for storing and supporting processing in the memory 56. In addition to being operably coupled to the at least one light source 36 and the at least one light sensitive device 38, the control unit 52 may be associated with one or more input/output devices 60. In an embodiment, the input/output devices 60 may include an alarm or other signal, or a fire suppression system which are activated upon detection of a predefined event or condition. It should be understood herein that the term alarm, as used herein, may indicate any of the possible outcomes of a detection.

The processor 54 may be coupled to the at least one light source 36 and the at least one light sensitive device 38 via connectors. The light sensitive device 38 is configured to convert the scattered light received from a node 34 into a corresponding signal receivable by the processor 54. In an embodiment, the signal generated by the light sensing device 38 is an electronic signal. The signal output from the light sensing device 38 is then provided to the control unit 52 for processing using an algorithm to determine whether a predefined condition is present.

The signal received by or outputted from the light sensitive device(s) 38 may be amplified and/or filtered, such as by a comparator (not shown), to reduce or eliminate irrelevant information within the signal prior to being communicated to the control unit 52 located remotely from the node 34. In such embodiments, the amplification and filtering of the signal may occur directly within the light sensing device 38, or alternatively, may occur via one or more components disposed between the light sensing device 38 and the control unit 52. The control unit 52 may control the data acquisition of the light sensitive device 38, such as by adjusting the gain of the amplifier, the bandwidth of filters, sampling rates, the amount of timing and data buffering for example.

Figure 8:
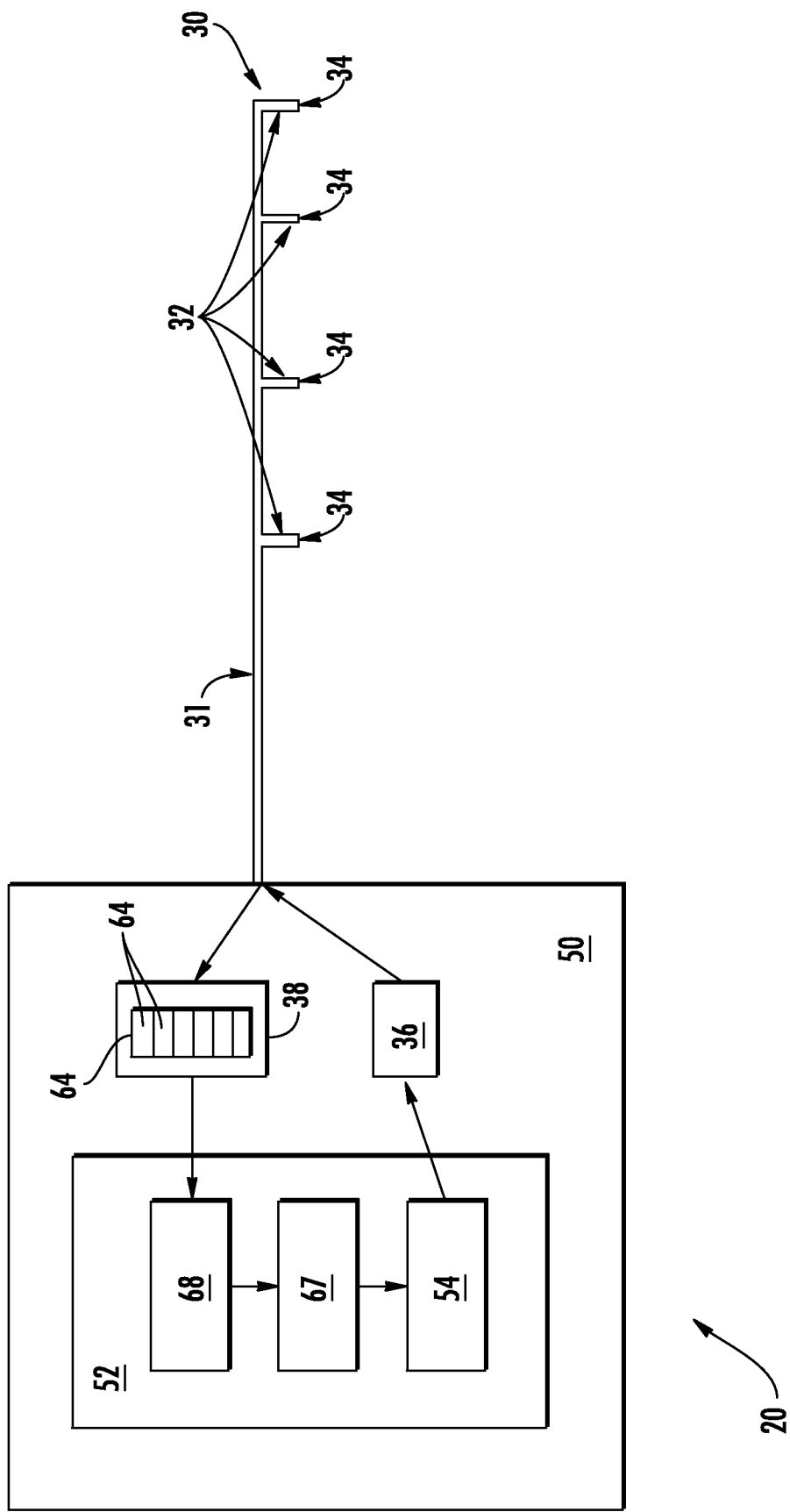
FIG. 8 is another schematic diagram of a detection system including an avalanche photo diode sensor according to an embodiment.

With reference now to FIG. 8, in an embodiment of the system 20, the light sensitive device 38 may include one or more Avalanche Photodiode (APD) sensors 64. For example, an array 66 of APD sensors 64 may be associated with the one or more fiber harnesses 30. In an embodiment, the number of APD sensors 64 within the sensor array 66 is equal to or greater than the total number of fiber harnesses 30 operably coupled thereto. However, embodiments where the total number of APD sensors 64 within the sensor array 66 is less than the total number of fiber harnesses 30 are also contemplated herein.

Data representative of the output from each APD sensor 64 in the APD array 66 is periodically taken by a switch 68, or alternatively, is collected simultaneously. The data acquisition 67 collects the electronic signals from the APD and associates the collected signals with metadata. The metadata as an example can be time, frequency, location or node. In an example, the electronic signals are from the APD are synchronized to the laser modulation such that the electrical signals are collected for a period of time that starts when the laser is pulsed to several microseconds after the laser pulse. The data will be collected and processed by the processor 54 to determine whether any of the nodes 34 indicates the existence of a predefined condition or event. In an embodiment, only a portion of the data outputted by the sensor array 66, for example the data from a first APD sensor 64 associated with a first fiber harness 30, is collected. The switch 68 is therefore configured to collect information from the various APD sensors 64 of the sensor array 66 sequentially. While the data collected from a first APD sensor 64 is being processed to determine if an event or condition has occurred, the data from a second APD 66 of the sensor array 66 is collected and provided to the processor 54 for analysis. When a predefined condition or event has been detected from the data collected from one of the APD sensors 64, the switch 68 may be configured to provide additional information from the same APD sensor 64 to the processor 54 to track the condition or event.

Figure 9:
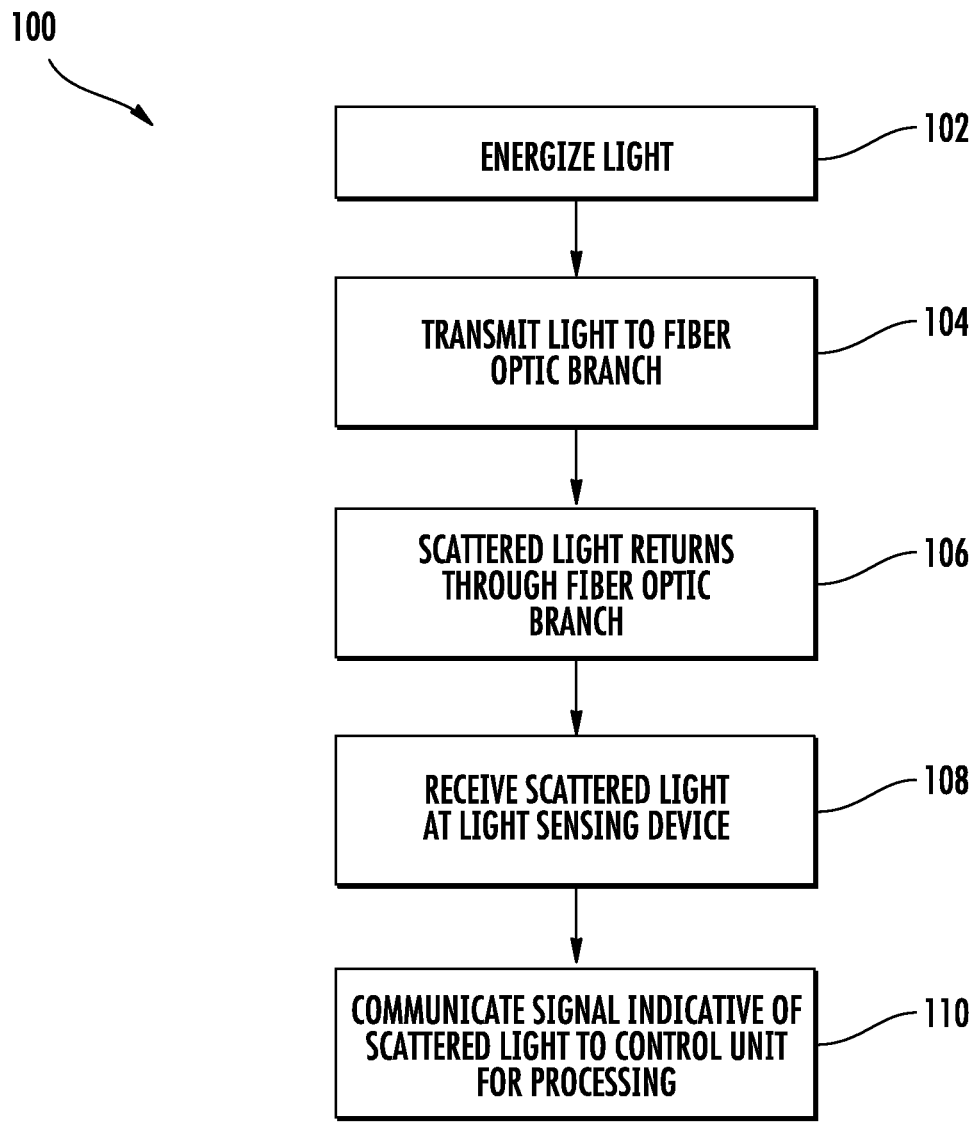
FIG. 9 is a method of operating a detection system according to an embodiment.

A method of operation 100 of the detection system 20 is illustrated in FIG. 9. The control unit 52 operably coupled to the light source 36 is configured to selectively energize the light source 36, as shown in block 102, and to emit light to a fiber harness 30 coupled thereto as shown in block 104. Based on the desired operation of the detection system 20, the control unit 52 may vary the intensity, duration, repetition, frequency, or other properties, of the light emitted. As the light travels down the first fiber core 40 of the at least one fiber optic branch 32, all or a portion of the light is emitted at one or more nodes 34 of the fiber harness 30. In block 106, light is scattered in the predetermined area and transmitted back through the fiber optic branches 32 via the second fiber cores 42. The scattered light may include one or more of scattered light within the atmosphere adjacent the node and scattered light that reflects from an interior of the fiber optic branch 32. The scattered light is transmitted to the at least one light sensing device 38 in block 108. As shown in block 110, the light sensing device 38 generates a signal in response to the scattered light received by each node 34, and provides that signal to the control unit 52 for further processing.

Figure 10:
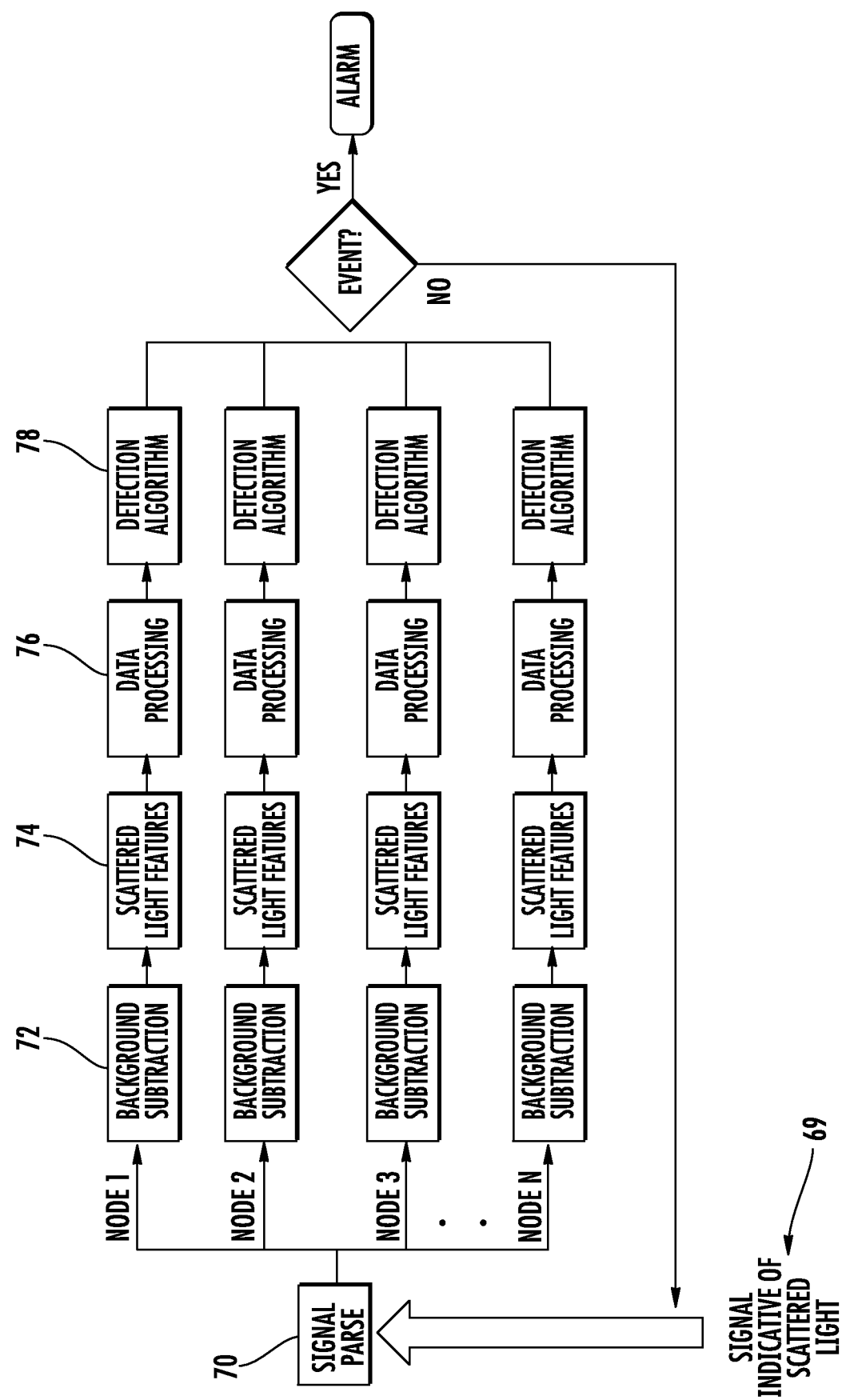
FIG. 10 is a schematic diagram of process flow for evaluating the signals generated by the light sensitive device according to an embodiment.

Using the algorithm 58 executed by the processor 54, each of the signals representing the scattered light received by the corresponding nodes 34 are evaluated to determine whether the light at the node 34 is indicative of a predefined condition, such as smoke for example. With reference to FIG. 10, a schematic diagram illustrating an example of a flow path for processing the signals generated by each of the nodes 34 is illustrated. As shown, the signal indicative of scattered light 69 is parsed, shown at block 70, into a plurality of signals based on their respective originating node 34. In the illustrated, non-limiting embodiment, background signals, illustrated schematically at 72, are subtracted from the data before the pulse features are evaluated for each of the individual signals. Through integration, pulse compression, and/or feature extraction, shown at block 74, one or more characteristics or features (pulse features) of the signal may be determined. Examples of such features include, but are not limited to, a peak height, an area under a curve defined by the signal, statistical characteristics such as mean, variance, and/or higher-order moments, correlations in time, frequency, space, and/or combinations thereof, and empirical features as determined by deep learning, dictionary learning, and/or adaptive learning and the like.

In an embodiment, the time of flight record is parsed and features are extracted. The time of flight record can cover a period of time. For example, a time of flight record can record light intensity over 0.001-1,000,000 nanoseconds, 0.1-100,000 nanosceconds, or 0.1-10,000 microseconds. The features extracted from the signal can include, but are not limited to height, full width at half maximum, signal pick up time, signal drop off time, group velocity, integration, rate of change, mean, and variance for example.

Through application of the data processing, illustrated schematically at block 76, the features may then be further processed by using, for example, smoothing, Fourier transforms or cross correlation. In an embodiment, the processed data is then sent to the detection algorithm at block 78 to determine whether or not the signal indicates the presence and/or magnitude of a condition or event at a corresponding node 34. This evaluation may be a simple binary comparison that does not identify the magnitude of deviation between the characteristic and a threshold. The evaluation may also be a comparison of a numerical function of the characteristic or characteristics to a threshold. The threshold may be determined a priori or may be determined from the signal. The determination of the threshold from the signal may be called background learning. Background learning may be accomplished by adaptive filtering, model-based parameter estimation, statistical modeling, and the like. In some embodiments, if one of the identified features does not exceed a threshold, the remainder of the detection algorithm is not applied in order to reduce the total amount processing done during the detection algorithm. In the event that the detection algorithm indicated the presence of the condition at one or more nodes 34, an alarm or other fire suppression system may, but need not be activated. It should be understood that the process for evaluating the data illustrated and described herein is intended as an example only and that other processes including some or all of the steps indicated in the FIG. are also contemplated herein.

The evaluation may also advantageously employ classifiers including those that may be learned from the signal via deep learning techniques including, but not limited to deep neural networks, convolutional neural networks, recursive neural networks, dictionary learning, bag of visual/depth word techniques, Support Vector Machine (SVM), Decision Trees, Decision Forests, Fuzzy Logic, and the like. The classifiers may also be constructed using Markov Model techniques, Hidden Markov Models (HMM), Markov Decision Processes (MDP), Partially Observable MDPs, Markov Decision Logic, Probabilistic Programming, and the like.

In addition to evaluating the signals generated from each node 34 individually, the processor 54 may additionally be configured to evaluate the plurality of signals or characteristics thereof collectively, such as through a data fusion operation to produce fused signals or fused characteristics. The data fusion operation may provide information related to time and spatial evolution of an event or predetermined condition. As a result, a data fusion operation may be useful in detecting a lower level event, insufficient to initiate an alarm at any of the nodes 34 individually. For example, in the event of a slow burning fire, the light signal generated by a small amount of smoke near each of the nodes 34 individually may not be sufficient to initiate an alarm. However, when the signals from the plurality of nodes 34 are reviewed in aggregate, the increase in light returned to the light sensitive device 38 from multiple nodes 34 may indicate the occurrence of an event or the presence of an object not otherwise detected. In an embodiment, the fusion is performed by Bayesian Estimation. Alternatively, linear or non-linear joint estimation techniques may be employed such as maximum likelihood (ML), maximum a priori (MAP), non-linear least squares (NNLS), clustering techniques, support vector machines, decision trees and forests, and the like.

As illustrated and described above, the processor 54 is configured to analyze the signals generated by at least one light sensing device 38 relative to time. In another embodiment, the detection algorithm may be configured to apply one or more of a Fourier transform, Wavelet transform, space-time transform, Choi-Williams distribution, Wigner-Ville distribution and the like, to the signals to convert the signals from a temporal domain to a frequency domain. This transformation may be applied to the signals when the nodes 34 are being analyzed individually, when the nodes 34 are being analyzed collectively during a data fusion, or both.

The relationship between the light scattering and the magnitude or presence of a condition is inferred by measuring a signal's causality and dependency. As an example, the measure of a causality utilizes one or more signal features as an input and determines one or more outputs from a calculation of a hypothesis testing method, foreground ratio, second derivative, mean or Granger Causality Test. Similarly, one or more signal features may be used as an input to evaluate the dependency of a signal. One or more outputs are selected from a calculation of a correlation, fast Fourier transform coefficients, a second derivative, or a window. The magnitude and presence of the condition is then based on the causality and dependency. The magnitude and presence of a condition may be calculated utilizing one or more evaluation approaches: a threshold, velocity, rate of change or a classifier. The detection algorithm may include utilizing the output from the calculation causality, dependency or both. This is used to indicate the presence of the condition at one or more nodes 34 and initiate a response.

Because the frequency of smoke varies within a small range, such as from about 0.01 Hz to about 10 Hz for example, evaluation of the signals with respect to frequency may effectively and accurately determine the presence of smoke within the predetermined space 82. The detection algorithm may be configured to evaluate the signals in a fixed time window to determine the magnitude of the frequency or the strength of the motion of the smoke. Accordingly, if the magnitude of a frequency component exceeds a predetermined threshold, the detection algorithm may initiate an alarm indicating the presence of a fire. In an embodiment, the predetermined threshold is about 10 Hz such that when the magnitude of the optical smoke frequency exceeds the threshold, smoke is present.

Figure 11B:
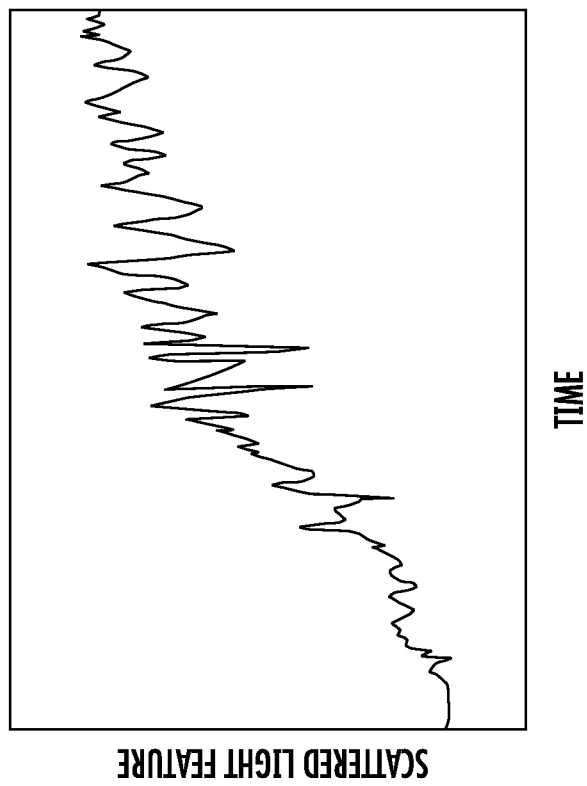
FIGS. 11a and 11b are diagrams illustrating the signals recorded by the detection system over time for various predefined conditions or events according to an embodiment.
Figure 11A:
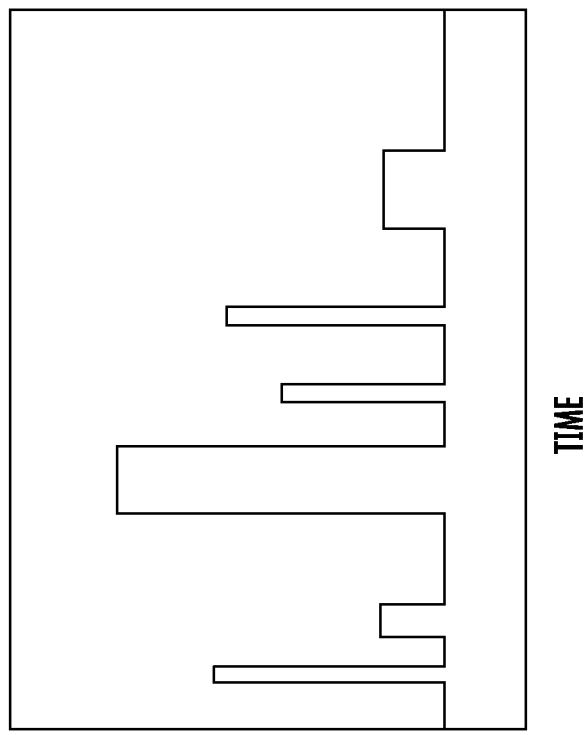

In an embodiment, the algorithm 58 is configured to distinguish between different events or conditions based on the rate of change in the light scattered by the atmosphere near the node 34 and received by one or more of the nodes 34 over time. With reference to FIGS. 11a and 11b, graphs of the signals recorded from a node 34 over time with respect to different events are illustrated. FIG. 11a indicates the change in the light signal received by a node 34 as a person walks through the area being monitored by the node 34. As shown in the graph, the movement of a person appears as steps having varying magnitudes. FIG. 11b, which represents the detection of smoke from a smoldering fire, appears graphically as a much continuously changing signal having an accelerating increase in the change in light signal received by a node 34 over time. It should be understood that the graphs illustrated are examples only. Further, each predefined event detectable by the detection system 20 may have one or more unique parameters associated therewith.

To reduce the noise associated with each signal, the light emitting device 36 may be modulated such that the device 36 is selectively operated to generate modulated light in a specific pattern. In an embodiment, the light within the pattern may vary in intensity, width, frequency, phase, and may comprise discrete pulses or may be continuous. The specific pattern of light may be designed to have desirable properties such as a specific autocorrelation with itself or cross-correlation with a second specific pattern. When the light is emitted in a specific pattern, the light scattered back to a corresponding light sensing device 38 should arrive in the substantially same pattern. Use of one or more specific and known patterns provides enhanced processing capabilities by allowing for the system 20 to reduce overall noise. This reduction in noise when combined with the signal processing may result in an improved signal to noise ratio and the total number of false events or conditions detected will decrease. Alternatively, or in addition, the device sensitivity may be improved thereby increasing the limits of the detection system 20. Similarly, by cross-correlating one or more second patterns, specific causes of transmitted or reflected signals may be distinguished, e.g. by Bayesian estimation of the respective cross-correlations of the received signal with the one or more second patterns.

In addition, modulation of the light signal emitted by the light source 36 may provide improved detection by determining more information about the event or condition causing the scatter in the light signal received by the node 34. For example, such modulation may allow the system 20 to more easily distinguish between a person walking through the designated area adjacent a node, as shown in FIG. 11a, and a smoldering fire adjacent the node 34.

Figure 12A:
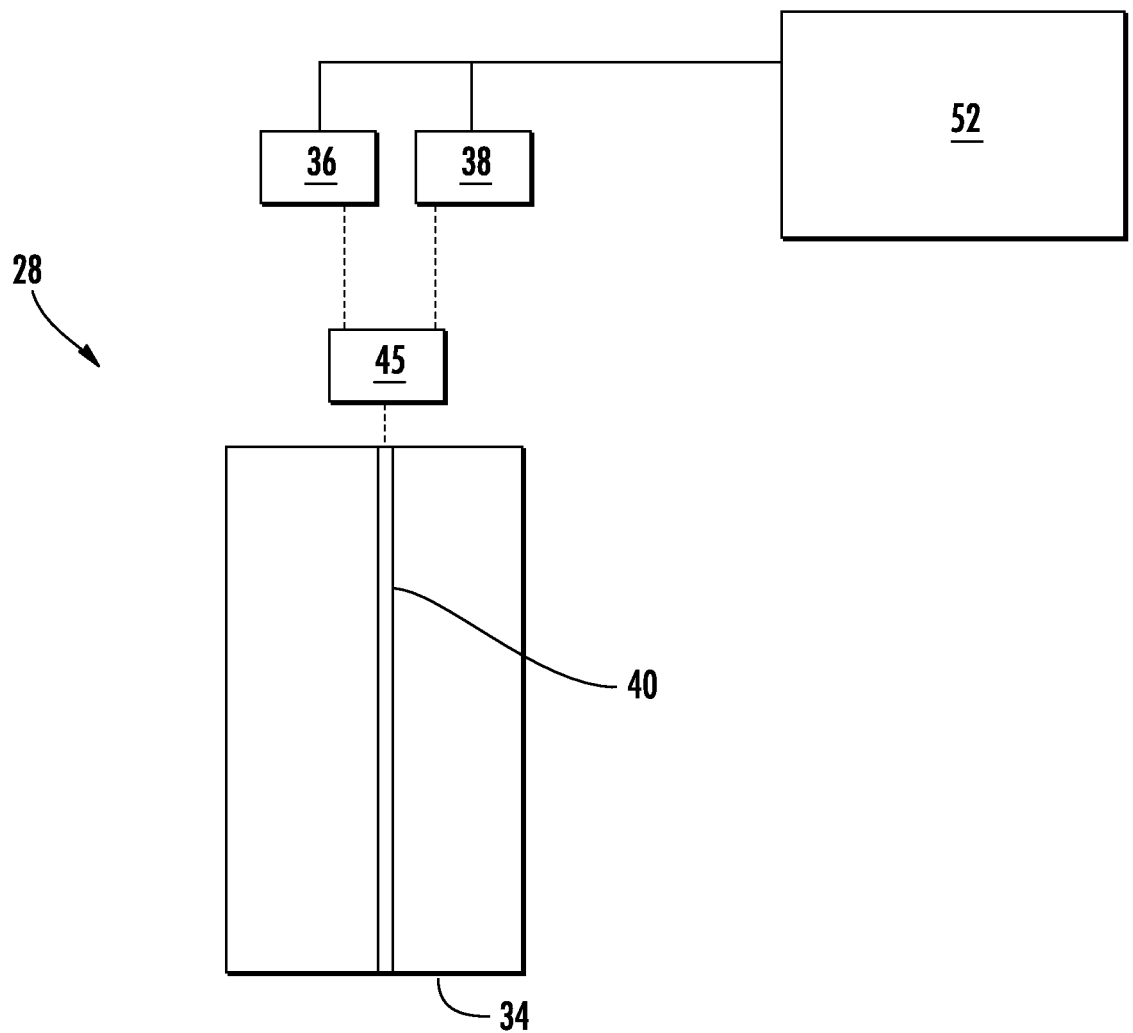
FIG. 12A is a schematic diagram of a node of the fiber harness of FIG. 1 according to an embodiment.

To more accurately determine the presence of a condition, such as a fire, smoke, or other aerosols for example, the detection system 20 may be configured to emit and detect multiple wavelengths of light. In addition, the detection system 20 may be configured to detect not only the presence of particles in the ambient air adjacent a node 34, but also the temperature adjacent the node 34. In order to determine the temperature at each node 34, light is transmitted down a first core 40 of a fiber optic cable 28. Because the refractive index of the first core 40 is different than the ambient atmosphere, some of the light will be reflected back down the first core 40 at the interface between the first core 40 and the ambient atmosphere. As the temperature changes, the refractive index of the first core 40 changes, and therefore the light reflected back down the first core 40 will be affected. As shown in FIG. 12A, a fiber optic circulator 45 can be utilized to direct the light between the light source 36, light sensitive device 38, and the fiber optic cable 28.

Figure 12B:
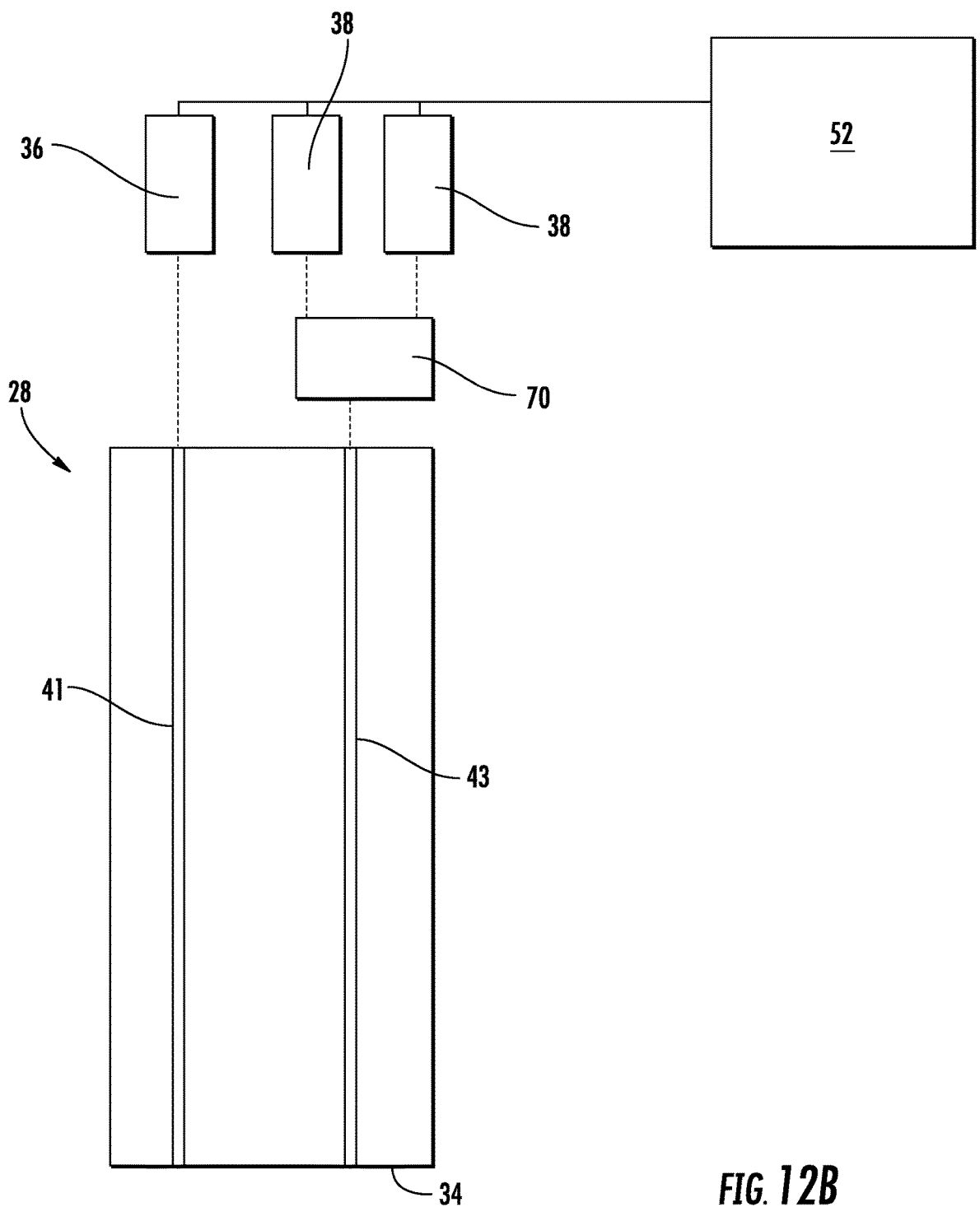
FIG. 12B is another schematic diagram of a node of the fiber harness of FIG. 1 according to an embodiment.

In addition, multiple wavelengths can be utilized to improve the measurements of the conditions. In the illustrated non-limiting embodiment, such improvements may include measurements of temperature and discrimination of nuisance conditions. As shown in FIG. 12B, a device 70 is operably connected to a fiber optic cable 28, with at least one emitting core 41 and at least one receiving core 43. The device 70 is configured to split the scattered light from a node 34 into multiple wavelengths is operably coupled to the receiving fiber core 43 associated with the node 34. Each of the wavelengths of the reflected or scattered light is then provided to a distinct light sensitive device 38 for conversion into an electrical signal before being communicated to the control unit 52. In the illustrated non-limiting embodiment, the reflected or scattered light is divided into a first wavelength and a second wavelength. However, embodiments where the reflected or scattered light is divided into any number of wavelengths are within the scope of the disclosure.

The algorithm 58 executed by the processor 54 is configured to analyze the two or more signals associated with each of the nodes 34. Together, the processor 54 is configured to use the known wavelengths and the algorithms to determine not only whether a condition is present within the predetermined area, but also what the temperature is near the nodes 34. This temperature information may be relevant to other systems within the aircraft or a building. For example, in embodiments where the detection system 20 is integrated into an aircraft, the temperature may be particularly relevant to the air quality system of the aircraft.

While the disclosure has been described in detail in connection with only a limited number of embodiments, it should be readily understood that the disclosure is not limited to such disclosed embodiments. Rather, the invention can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A detection system for measuring the presence of one or more conditions in a predetermined area, comprising:
    a fiber harness having at least one fiber optic cable for transmitting light, the at least one fiber optic cable defining a node arranged to measure the one or more conditions, wherein the node is arranged such that light scattered by an atmosphere adjacent the node is received by at least one core of the fiber optic cable
    a device configured to split the scattered light from the node into a plurality of wavelengths;
    a control system operably connected to the fiber harness, the control system including:
        at least one light source for transmitting light to the node; and
        a plurality of light sensitive devices configured to receive the scattered light associated with the node split into a plurality of wavelengths, wherein the control system is configured to analyze a plurality of signals corresponding to the plurality of wavelengths of the scattered light associated with the node to determine at least one of a presence and magnitude of the one or more conditions at the node.

2. The system according to claim 1, wherein the control system analyzes the plurality of signals corresponding to the plurality of wavelengths of the scattered light to determine a temperature near the node.

3. The system according to claim 1, wherein the plurality of signals includes a first signal corresponding to a first wavelength and a second signal corresponding to a second wavelength, the first wavelength and the second wavelength being different.

4. The system according to claim 1, wherein at least one of the plurality of light sensitive devices is a photodiode.

5. The system according to claim 1, wherein at least one wavelength of the plurality of wavelengths of scattered light associated with the node is transmitted to the at least one of the plurality of light sensitive devices.

6. The system according to claim 5, wherein the at least one light sensitive device of the plurality of light sensitive devices converts the at least one wavelength of the plurality of wavelengths of scattered light associated with the node into the at least one signal.

7. The system according to claim 6, wherein each of the plurality of light sensitive devices is configured to convert one of the plurality of wavelengths of scattered light into one signal of the more than one signals.

8. The system according to claim 1, wherein the light source is a laser diode.

9. The system according to claim 1, wherein the predetermined area is a portion of an aircraft.

10. The system according to claim 1, wherein the one or more conditions include the presence of smoke in the predetermined area.

11. A method of detecting one or more conditions within a predetermined area comprising:
transmitting light along a fiber harness and through a node of a fiber optic cable of the fiber harness, the node arranged to measure the one or more conditions;
receiving at least one wavelength of scattered light associated with the node;
splitting the scattered light received from the node into a plurality of wavelengths via a device mounted adjacent the node;
communicating a plurality of signals corresponding to each of the plurality of wavelengths of the scattered light to a control unit, wherein the plurality of signals corresponding to the plurality of wavelengths of scattered light is communicated to the control unit from a plurality of light sensitive devices; and
analyzing the plurality of signals to determine at least one of a presence and magnitude of the one or more conditions within the predetermined area.

12. The method according to claim 11, wherein each of the plurality of light sensitive devices is operably coupled to the control unit to convert a respective wavelength of scattered light into one of the plurality of signals.

13. The method according to claim 11, further comprising determining a temperature near the node.

14. The method according to claim 13, wherein determining the temperature at the node uses the plurality of signals based on the plurality of wavelengths of scattered light associated with the node.

15. The method according to claim 14, wherein the method is configured to detect the presence or magnitude of smoke within an aircraft.

16. The method according to claim 15, wherein the temperature near the at least one node is provided to another system of the aircraft.

* * * * *